(12) United States Patent
Stükerjürgen (10) Patent No.: US 9,370,894 B2
(45) Date of Patent: Jun. 21, 2016

(54) WOUND TUBE MADE OF PROFILED PLASTIC STRIPS

(76) Inventor: Ferdinand Stükerjürgen, Rietberg (DE)

( * ) Notice: Subject to any disclaimer, the term of this patent is extended or adjusted under 35 U.S.C. 154(b) by 967 days.

(21) Appl. No.: 13/392,809

(22) PCT Filed: Aug. 30, 2010

(86) PCT No.: PCT/EP2010/062650
§ 371 (c)(1),
(2), (4) Date: Feb. 27, 2012

(87) PCT Pub. No.: WO2011/026813
PCT Pub. Date: Mar. 10, 2011

(65) Prior Publication Data
US 2012/0156414 A1    Jun. 21, 2012

(30) Foreign Application Priority Data

Sep. 2, 2009  (DE) ............... 10 2009 043 932 U (51) Int. Cl.
| | | |
|---|---|---|
| *B29C 53/70* | (2006.01) | |
| *B29C 53/78* | (2006.01) | |
| *F16L 11/16* | (2006.01) | |
| *F16L 11/20* | (2006.01) | |
| *F16L 55/165* | (2006.01) | |
| *B29C 63/32* | (2006.01) | |

(52) U.S. Cl.
CPC ............... *B29C 53/78* (2013.01); *F16L 11/16* (2013.01); *F16L 11/20* (2013.01); *F16L 55/1655* (2013.01); *B29C 63/32* (2013.01); *Y10T 428/1393* (2015.01)

(58) Field of Classification Search
CPC ......... B29C 53/78; B29C 63/32; F16L 11/16; F16L 11/20
See application file for complete search history.

(56) References Cited

U.S. PATENT DOCUMENTS 5,225,019 A    7/1993  Huvey
5,660,912 A    8/1997  Menzel
(Continued)

FOREIGN PATENT DOCUMENTS

DE    37 17 418 C1    10/1988
JP    64-052726        3/1989
(Continued)

OTHER PUBLICATIONS

Machine Translation of JP 06190922.*
(Continued)

*Primary Examiner* — Christopher Schatz
(74) *Attorney, Agent, or Firm* — WRB-IP LLP (57) ABSTRACT

A wound tube is made of profiled plastic strips, the profiling of which comprises at least the edge region. The edge region is designed such that edge regions of successive coils, the edge regions lying mutually adjacent during winding, can be connected in a form-fitting manner, and at least one of the surfaces of the plastic strips has ribs projecting perpendicularly essentially to one side in order to form a flat inner surface during winding. The tube wall of the wound tube is designed as a double wall and is assembled from a first inner plastic strip and from a second outer plastic strip, wherein the ribs projecting perpendicularly essentially to one side fix the distance of the outer plastic strip from the inner plastic strip. A device with which such wound tubes can be advantageously produced on-site is also provided.

8 Claims, 6 Drawing Sheets

(56) References Cited

U.S. PATENT DOCUMENTS

| | | | |
|---|---|---|---|
| 5,669,420 A | | 9/1997 | Herrero |
| 6,009,912 A | * | 1/2000 | Andre .......................... 138/143 |
| 2002/0146521 A1 | * | 10/2002 | Toas et al. .................... 428/34.1 |
| 2008/0205991 A1 | * | 8/2008 | Bateman et al. ........... 405/184.2 |

FOREIGN PATENT DOCUMENTS

| | | |
|---|---|---|
| WO | 88/05513 A1 | 7/1986 |
| WO | 88/05884 A1 | 8/1988 |
| WO | 98/11374 A1 | 3/1998 |

OTHER PUBLICATIONS

International Search Report for corresponding International Application PCT/EP2010.062650.

JP 6 190922 A (Sekisui Chemical Co Ltd) Jul. 12, 1994 * abstract.

* cited by examiner

WOUND TUBE MADE OF PROFILED PLASTIC STRIPS

BACKGROUND AND SUMMARY

The invention concerns a wound tube made of profiled plastic strips whose edge regions are designed such that when winding contiguous edge regions of the plastic strip of two successive windings [said windings] can be connected in a form-fitting manner and in which at least one of the surfaces of the plastic strip has ribs that essentially project orthogonally and are equally spaced.

Wound tubes made of plastic strips are used in the restoration of waste water channels and are produced on site. In a process disclosed in EP 2 085 29 A1, DE 696 27 426 T2 or DE 696 35 214 T2 the tube is made in the waste water channel whereby the assembler moves through the waste water channel as the production progresses and makes the wound tube from a profiled plastic strip that is guided through its assembler portion. In a different process that is disclosed in EP 0 023 242 or EP 0 109 413 the assembler is stationary in a revision shaft of the waste water channel that is to be restored and the profiled plastic strip is provided via the revision shaft. The wound tube that is made by the assembler is inserted into the channel as it is finished. The plastic strips used for making such wound tubes comprise a groove extending longitudinally along an edge side and a bead extending longitudinally along the other edge side so that the bead of the one edge region fits into the groove of the subsequent edge region in a form-fitting manner during winding. This form-fitting results in a tight connection which can be improved using additional means, for example cold welding.

In such wound tubes poor stability, at least in large diameter tubes, is a disadvantage. By including radially projecting ribs on the outer surface of the plastic strip forming the outer wall, stability can be increased, however, here, too, the diameter for stable wound tubes is limited. To compensate for this insufficiency and to provide sufficient stability, the hollow spaces that necessarily remain between the wall of the waste water channel and the wall of the wound tube in these manufacturing processes must be filled.

It is desirable to provide a wound tube with increased stability that can easily and inexpensively be produced with profiled plastic strips on site for the restoration of waste water channels and can be introduced into the channel to be restored without any complete filling; furthermore a device is to be provided with which such wound tubes can advantageously be produced on site.

In wound tubes according to an aspect of the invention, the tube walls are double walls. To this end a first, inner plastic strip and a second outer plastic strip are joined so that the two plastic strips are at a radial distance from one another. Essentially orthogonally projecting ribs of the two joined plastic strips are arranged radially and opposite one another for support purposes. The arrangement is such that the edge region of the one plastic strip is offset by at least one rib distance in axial direction in relation to the edge region of the other plastic strip. By offsetting the edge region of the inner plastic strip in relation to the edge region of the outer plastic strip, joining them automatically is facilitated. The plastic strip forming the outer wall advantageously also has ribs projecting on the outside, which significantly increases the stability of the resulting wound tube. Such plastic strips can easily be produced using extrusion.

In an advantageous further development at least some of the ribs, preferably all of them, of one of the plastic strips are reinforcement ribs with a rib head. The ribs of the other plastic strip corresponding to these ribs comprise a head receptacle that can accommodate the respective rib heads. After the two plastic strips are joined to form the double wall band, the respective rib heads are inside the respective head receptacles—in this manner the inner and outer plastic strips are joined in a form-fitting manner.

It further is advantageous for both plastic strips to comprise reinforcement ribs with rib heads and ribs with head receptacle. They are arranged alternately so that both identically designed plastic strips can be joined to form the plastic band by joining the ribs that face each other. After the two plastic strips are joined, the respective rib heads are located in the respective head receptacles in a form-fitting manner. This means production is restricted to one plastic band with a uniform cross-section and only spools of identical plastic strips with a uniform cross-section are required on site.

This connection is locked into position. To this end the engaging rib heads are designed as a kind of harpoon head and the head receptacles are designed accordingly so that when the outer plastic strip and the inner plastic strip are joined, they slide into place and automatically secure the connection. To make this permanent, it is possible to glue or weld the connection. To this end at least some of the rib heads and/or head receptacles contain glue or an agent that results in cold welding and thus can be glued or welded together.

When producing the wound tube, the two plastic strips are joined to form a double strip and are bent around a bend radius that corresponds to the diameter of the tube to be inserted into the channel that is to be restored. This results in a difference in length between the outer plastic strip and the inner plastic strip. To compensate for this difference in length, at least one of the plastic strips comprises means for compensating for the length. To this end it is advantageous to have U-shaped or OMEGA-shaped elbows between two reinforcement ribs or between two ribs.

To secure the connection of the edges, a counter bracket with latch head receptacle is provided in one edge region of the plastic strips while the other edge region of the second plastic strip comprises a retaining rib with a retaining rib head. This retaining rib head is designed such that it is inserted into the latch head receptacle of the counter bracket and latches when the edge regions of the two plastic strips of two adjacent windings of the wound tube are joined. It further is advantageous when a locking rib is molded at an obtuse angle to the edge region of one of the plastic strips. When the edge regions of the two plastic strips are joined, said locking rib rests against and blocks the outermost reinforcement rib. It is understood that in order to maintain the uniform cross-section, one of the edge regions of the plastic band must comprise counter brackets with latch head receptacles and the other edge region must comprise retaining ribs with retaining rib heads and one edge region comprises a locking rib arranged at an obtuse angle.

A suitable device for producing such wound tubes is a set of rollers that is arranged in the area of the mouth of the channel that is to be restored said set of rollers forming the winding for the wound tube. However, it comprises a roller advance for joining the two plastic strips to form the double band required for the wound tube so that the joined double band is fed to the set of rollers for forming the winding.

It is advantageous when the roller set is preceded by a device with which glue or an agent for cold welding the engaging ribs of the plastic strips and/or the engaging edge regions of the plastic strip can be applied. These means secure the per se solid latching of the joined plastic strips.

When applying the glue or the agent for cold welding in the glue application device, the application occurs with a roller.

To this end an application roller runs through a glue reservoir and takes up glue when it resurfaces. Then the glue or the agent for cold welding that was taken up is transferred to the respective areas of the plastic strip whereby pressure rollers ensure that the application is carried out properly. A different process would be a spray on process whereby areas of the plastic strip that do not need to be sprayed are covered in the spray area. In both cases it is possible to arrange wipe off devices that remove any excess glue. For certain types of glue joining must occur immediately after the glue is applied. In this case the glue application device is arranged directly in front of the rollers that join the two plastic strips. If the glue must dry for a certain period of time, the time period can be adjusted by selecting the corresponding distance between the glue application device and the rollers that join the two plastic strips and taking the respective feed rate into account. An application with other means, such as spray cans, is possible as well.

The plastic strips are removed from the storage spools that are above ground and are fed to the on-site winding assembler through the revision shaft. In doing so, the surface of the plastic strips can pick up dirt, which can impede the latching of the ribs and the edge regions. To avoid this problem and to protect the plastic strips that are removed from the storage spools and fed to the winding assembler with intake roller set through the revision shaft, means for protecting the profile are arranged in the revision shaft that surround both plastic strips and thus protect them against dirt in particular. In case of deep channels the suspended load of the plastic strips that are fed to the winding assembler through the revision shaft can become so high that it might affect the feed process. In such cases it is advantageous to include additional brake rollers that take up at least part of the load. Said brake rollers advantageously are arranged in the protection guide.

BRIEF DESCRIPTION OF THE DRAWINGS

The character of the invention is described in more detail based on the exemplary embodiments shown in FIGS. 1 through 8. The following is shown.

DETAILED DESCRIPTION

Figure 1:
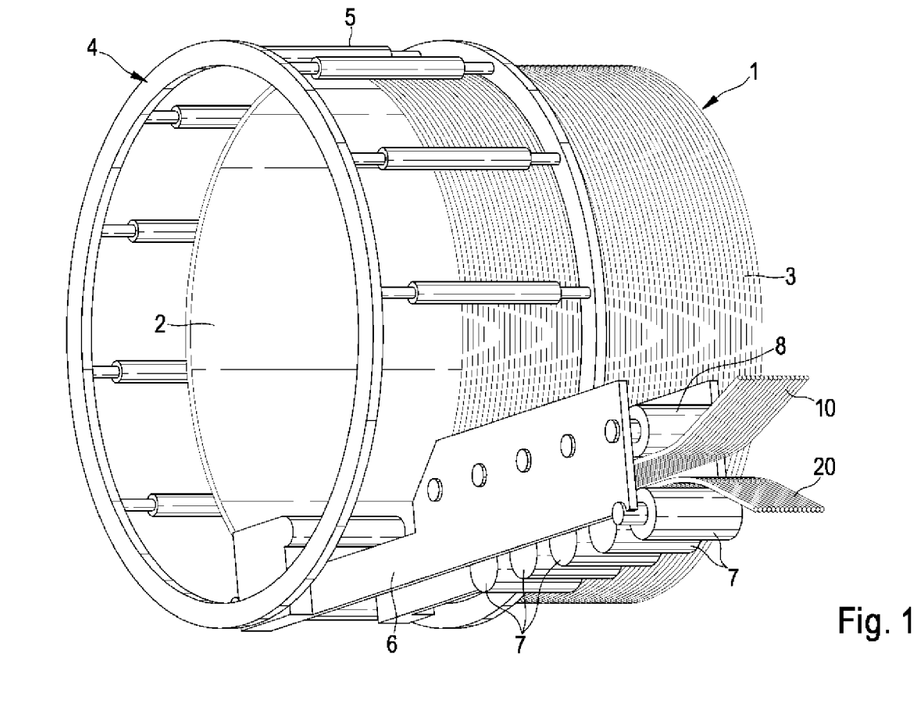
FIG. 1: Wound tube being assembled (schematically)

To produce the wound tube 1, first the inner plastic strip 10 is joined with the outer plastic strip 20 to form the double band 30 (FIG. 8) from which the wound tube 1 is formed in a winding assembler 4 that is positioned in a stationary manner in front of the mouth of the channel that is to be restored "KA" and then, with each new winding of the wound tube 1, is advanced inside the channel by one strip width of the double band 30. This is supported on one hand by the intake rollers 7 and 8 that are arranged in the roll-former type shaped intake 6 and that precede the winding assembler 4. FIG. 1 shows a schematic view of the winding assembler 4.

Using the winding cage 5 and the rollers 5.1 of the winding assembler 4 the double band 30 is positioned in the curvature that is adjusted to the curvature radius of the preceding winding of the wound tube 1 and the edge regions 14.1 and, respectively, 24.1 of the inner and outer plastic strip 10 and, respectively, 20 are aligned with the corresponding edge regions 14.2 and, respectively, 24.2 of the inner plastic strip 10' and, respectively, the outer plastic strip 20' of the double band 30' of the preceding winding while these edge regions are joined to form the complete wound tube.

Figure 2:
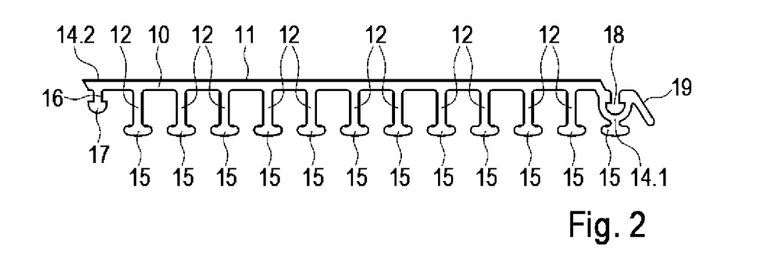
FIG. 2: Inner strip (profile)
Figure 3:
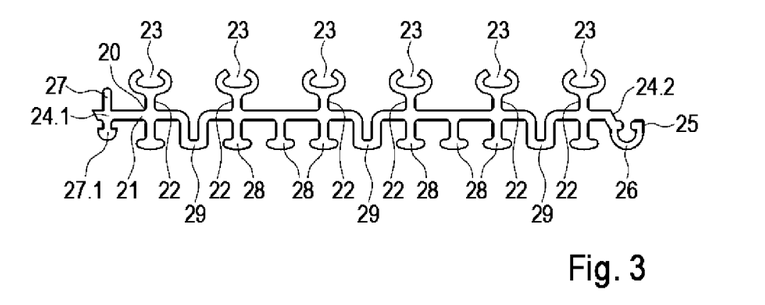
FIG. 3: Outer strip (profile)

To be able to connect the two plastic strips 10 and 20 and to join their edge regions when making the wound tube 1, the two plastic strips 10 and 20 have correspondingly complementary profiles that are described below:

FIGS. 2 and 3 show a cross-section of the two plastic strips 10 and 20 and their profiles. Between its edge regions 14.1 and 14.2 the inner plastic strip 10, on the wall that serves as the inside, comprises ribs that project essentially orthogonally that are support ribs 12. The free ends of the support ribs 12 are formed as rib heads 13. Between its two edge regions 24.1 and 24.2 the outer plastic strip 20 also comprises ribs 22 whose free ends are formed as head receptacles 23.

Figure 7:
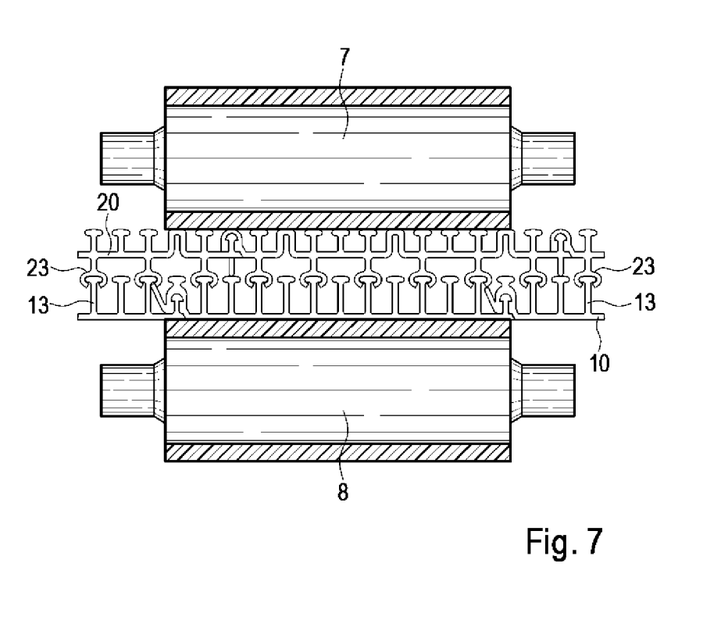
FIG. 7: Double strip rib heads and head receptacles glued.

These head receptacles 23 are designed such that the rib heads 13 of the opposite support ribs 12 can be inserted and connected in a form-fitting manner. It is advantageous to apply glue to at least some of the head receptacles 23 or at least some of the rib heads 13 (FIG. 7) that provides cold welding. Between two ribs 22 of the outer plastic strip 20 there are elbows 29—here shown to be U-shaped—to compensate for expansion.

To form the wound tube 1, the edge regions 14.1, 14.2 and 24.1 and 24.2 of two windings of the coil that are contiguous during winding must be joined. It is understood that latch head 15 and edge receptacle 18 or counter bracket 25 and latch head receptacle 26 and engaging rib head 27 of the edge rib 16 or counter bracket head 27.1 of the counter bracket 27 are at a distance from another by one circumferential length of the coil of the wound tube 1 in rolling direction of the plastic strip 10. To this end the edge region 14.1 of the first, inner plastic strip 10 comprises a molded latch head 15 and the edge region 14.2 of the other side of this plastic strip 10 comprises an edge rib 16 with a rib head 17. The latch head 15 comprises an edge receptacle 18 into which the rib head 17 can be inserted in a form-fitting manner when joined.

Figure 4:
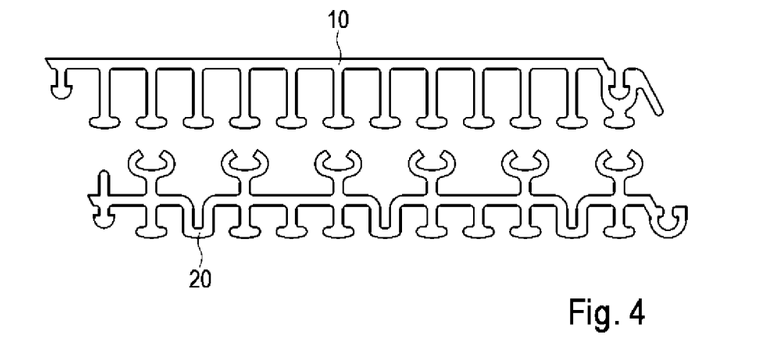
FIG. 4: Joined inner and outer strip.
Figure 5:
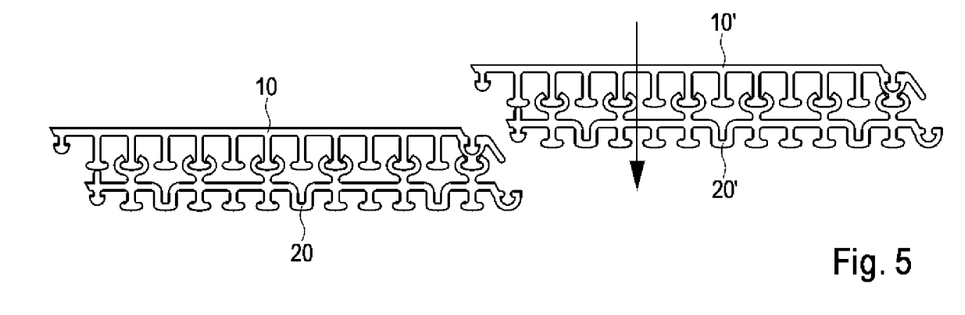
FIG. 5: Double strip prior to joining the edge regions.
Figure 6:
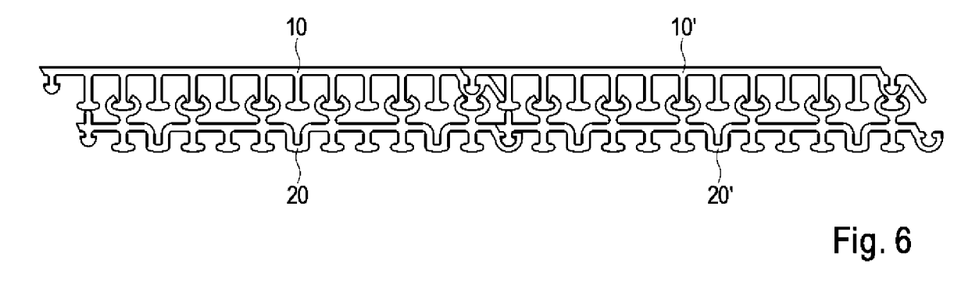
FIG. 6: Double strip with joined edge regions.

The edge regions 24.1 and 24.2 of the outer plastic strip 20 are joined analogously. Here, the one edge region 24.1 of the outer, second plastic strip 20 comprises a latch head receptacle 26 while the other end 24.2 comprises a counter bracket 27 with a counter bracket head 27.1. This counter bracket head 27.1 is inserted into the latch head receptacle 26 in a form-fitting manner when joined. This joining process is shown in individual steps in FIGS. 2, 3, and 4 for explanation purposes. FIG. 5 shows the position of the plastic strips 10 and 20 of two successive windings before they are joined to the wound tube 1 comprised of the two plastic strips 10 and 20, said joining process being complete in FIG. 6. In FIGS. 5 and 6 the plastic strips of the subsequent winding are identified as 10' and 20'.

To prevent the connection of the edge regions of the plastic strips 10 and, respectively, 20 of adjacent windings from separating using mechanical means, locking mechanisms are provided. To this end a locking rib 19 is molded to the edge region 14.1 of the first, inner wound tube 10 [sic]. When joined, the free end of the locking rib 19 rests against the adjacent support rib 12 of the edge region of the plastic strip 10 of the subsequent winding 10', thus locking this latched connection.

To secure the form-fitting connection of the plastic strips 10 and 20 as well as the edge regions of the plastic strips 10, 10' and 20, 20' of contiguous windings of a wound tube 1 in relation to one another, they are secured by gluing or cold welding them. To this end glue or an agent for cold welding is provided that are applied to the opposing insides of at least one of these plastic strips. This is shown schematically in FIG. 7 in an embodiment with the two plastic strips 10 and 20 between the intake rollers 7 and 8. Here the glue/agent was applied to the rib heads 13 that are latched into the head receptacles 23, thus securing the mechanical connection between the two by means of additional adhesive forces.

By connecting two plastic strips 10 and 20 to form the double strip and by bending it to adjust it to the curvature diameter of the wound tube, there is a difference in length because the circle length of the outer plastic strip 20 is correspondingly longer by the difference of the two radiuses. To compensate for that there are (as already described above) compensation means on one hand, and on the other hand the connecting points of two outer plastic strips shift in relation to the connection points of the inner plastic strips. This shift ensures that the connecting points of two outer plastic strips and the connecting points of two inner plastic strips are not on top of each other, which benefits production.

Figure 8:
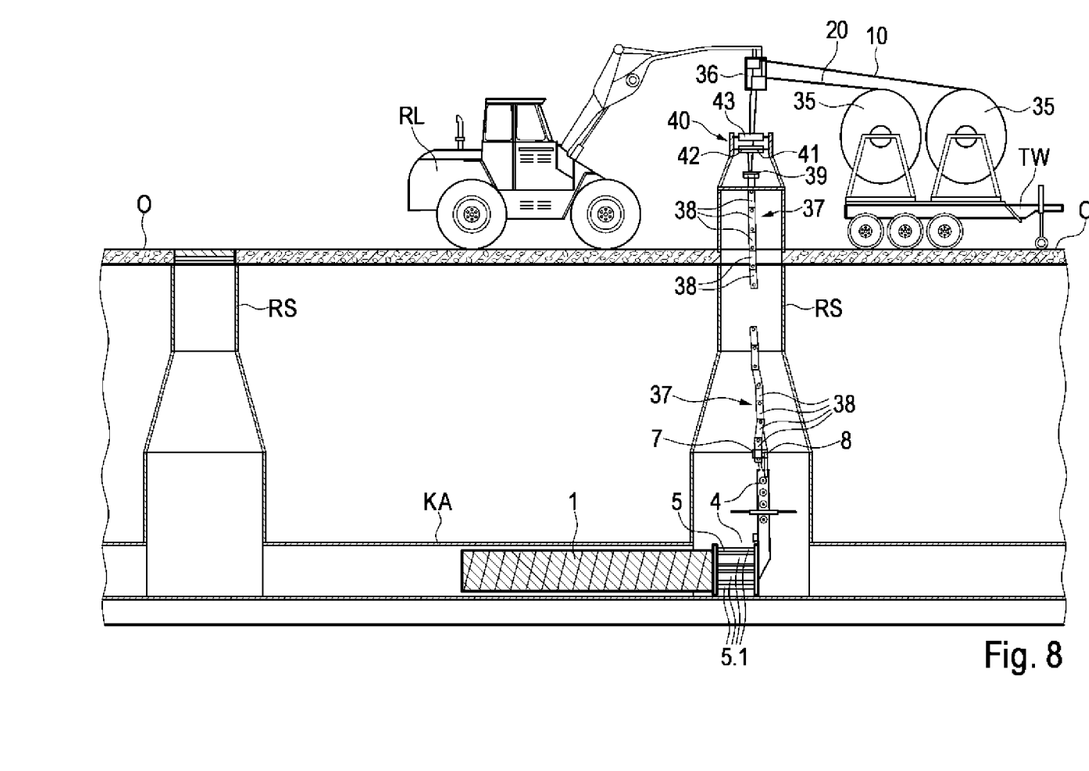
FIG. 8: Channel restoration with wound tube (schematically)

To restore a channel "KA" on site—as shown schematically in FIG. 8—two plastic strips 10 and 20 are used, plastic strip 10 for the inner band and the second plastic strip 20 for the outer band, that are stored on customary transport spools 35 from which they can be unwound, said transport spools being on a transport vehicle "TW" that is parked on the surface level "O" near the mouth of a revision shaft "RS". Once unwound from the transport spools 35, the two plastic strips 10 and 20 are fed through the revision shaft "RS" and to a winding assembler 4 which is set up at the bottom in front of the channel "KA" that is to be restored. To this end there are intake guides 36 above the mouth of the revision shaft "RS", which, in the exemplary embodiment shown, are held by the boom of a wheel loader "RL". Alternatively, this intake guide 36 could also be held by a mouth attachment 34 placed on the mouth of the revision shaft "RS".

The winding assembler 4 is preceded by the intake rollers 7 and 8 with which the two plastic strips 10 and 20 are joined to form the double band 30. This double band 30 is fed into the winding assembler whose intake 4.1, which is designed like a roll former and can also include the intake rollers 7 and 8 as an integrated component, aligns this double band 30 so that it is routed from the winding cage 5 of the winding assembler 4 into the curvature of the channel "KA" that is to be renovated and the edge regions [of said double band] are brought into contact with the edge regions of the inner band and outer band of the preceding winding of the wound tube 1, said edge regions being adjacent during winding (as is shown in FIGS. 5 and 6), and can be joined.

The plastic strips 10 and 20 that run through the revision shaft "RS" must be free of damage and other particles so the plastic strips can be joined. To ensure this, a profile protection 37 is provided in the revision shaft "RS" through which the plastic strips 10 and 20 run and thus are protected. This profile protection 37 is comprised of individual links 38 with approximately rectangular cross-section that are articulated in relation to one another and can be held by the boom of the wheel loader "RL" or a mouth attachment 34 placed on the mouth of the revision shaft "RS" or even by a separate crane.

In order to ensure that the plastic strips 10 and 20 that are to be joined are sufficiently clean, brush inserts 39 are provided. These brush inserts 39 expediently are located in the intake of the plastic strips 10 and 20 into the profile protection. If glue is to be applied, brushing expediently occurs prior to the application of the glue and the brush inserts 39 precede the device for applying glue.

If the channel that is to be restored 2 is very deep, it may be necessary to provide means that take up the load of the suspended plastic strip 10 and, respectively, 20 in the profile protection 37. Suitable means are roller arrangements with U-shaped or OMEGA-shaped deflection of the plastic strips.

Figure 9:
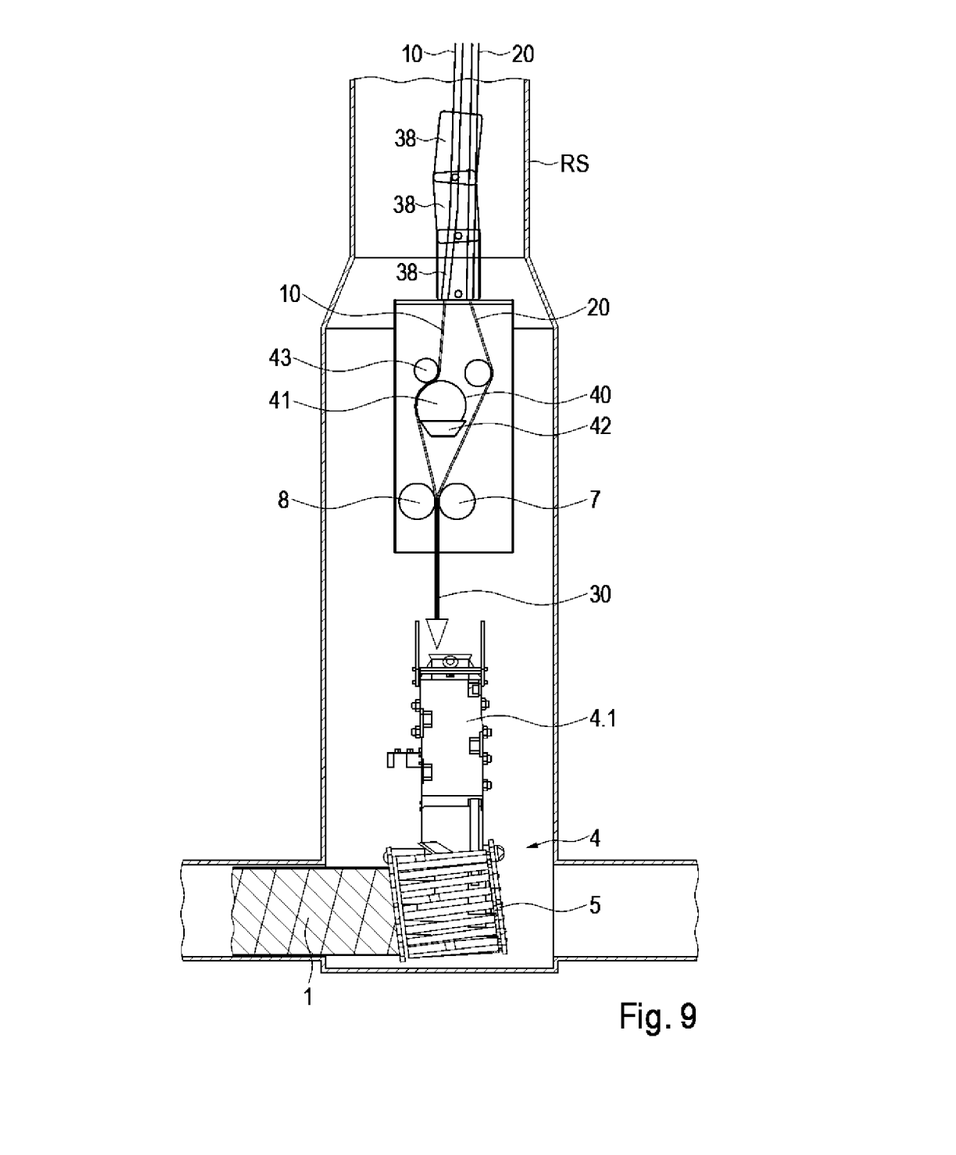
FIG. 9: Winding assembler in bottom of shaft with glue application device.

To secure the latching of the two plastic strips 10 and 20 to form the double band 30 by means of gluing or cold welding, glue application devices 40 (FIG. 8, 9) are provided that comprise an application roller 41 that runs through a glue reservoir and a pressure roller 43. In the process the pressure roller 43 guides the plastic strips 10 or 20 to which glue is to be applied in such a way that its surface that faces the other plastic strip 20 or 10 when they are joined, is in contact with the application roller 41. In the exemplary embodiment shown the inner plastic strip 10 and its ribs 12 with rib heads 13 is guided such that glue is applied to the rib heads 13 whereby the width and/or profiling of the application roller 41 determines the number of rib heads 13 to which glue is applied. This glue application device 40 can be arranged at the intake 4.1 in the winding assembler 4 (FIG. 9). In a different arrangement shown in FIG. 8, the glue application device 40 is located on the mouth attachment 34 whereby the glue supply to the glue reservoir 42 is not shown in either case. The plastic strips 10 and 20 that are prepared in this manner then are joined and latched in the intake rollers 7 and 8 or in the roller set of the intake 5 of the winding assembler 4 whereby the gluing or welding occurs. It is understood that the intake rollers 4.1, which are shown as two rollers here and cause the two plastic strips to join, also could be a multi-stage roller set.

REFERENCE NUMBERS

01: wound tube
02:
03:
04: winding assembler
04.1 intake
05: winding cage
05.1: rollers
06: intake
07: intake rollers
08: intake rollers
09:
10: inner plastic strips
10' winding
11: strip base
12: support ribs
13: rib heads
14.1 edge region of the inner plastic strip 10
14.2 edge region of the outer plastic strip
15: latch head
16: edge rib
17: rib head
18: edge rib/edge receptacle
19: locking rib
20: outer plastic strip
22: ribs
23: head receptacle
24.1 edge region of the inner plastic strip 10
24.2 edge region of the outer plastic strip 10/end
25. counter bracket
27: counter bracket head
27.1 counter bracket head
28: latch head receptacle 29: elbows
30: double band
31:
32:
33:
34: mouth attachment
35: transport spools
36: intake guides
37: profile protection
38: links
39: brush inserts
40: glue application devices
42: glue reservoir
41: application roller
42: glue reservoir
43: pressure roller
KA: channel "KA"
O: surface level "O"
RS: revision shaft "RS"
RL: wheel loader "RL"
TW: transport vehicle "TW"

The invention claimed is:

1. Device for producing a wound tube, comprising
two storage spools for two plastic strips of substantially equal width, the two storage spools being located above ground level,
a winding assembler including a rotating winding cage, the winding assembler being located in a stationary manner at a bottom of a revision shaft in an area of a mouth of a channel that is to be renovated,
a roll former type roller set with intake rollers configured to join the two plastic strips into a double-walled plastic band comprising an inner plastic strip and an outer plastic strip by joining mating structures of edge regions of the two plastic strips and to feed the double-walled plastic band to the winding assembler,
the winding cage of the winding assembler being configured to form successive windings of the double-walled plastic band in a curved fashion, the wound tube having a curvature corresponding to a curvature of the channel, the winding assembler being arranged to bring edge regions of the inner plastic strip and the outer plastic strip of the double-walled plastic band into contact with edge regions of an inner plastic strip and an outer plastic strip of a preceding winding of the wound tube and to join the edge regions of the inner plastic strip and the outer plastic strip of the double-walled plastic band with the edge regions of the inner plastic strip and the outer plastic strip of the preceding winding to produce the wound tube, and to advance the wound tube in the channel.

2. Device according to claim 1, wherein the mating structures of the edge regions of the two plastic strips comprise engaging rib heads and head receptacles, and the device comprises an adhesive application device for applying adhesive to at least one of the engaging rib heads and head receptacles of the two plastic strips to be joined and the edge regions of the outer plastic strip and the inner plastic strip of the double-walled plastic band to be joined with the edge regions of the inner plastic strip and the outer plastic strip of the preceding winding, and the adhesive application device comprises means for application.

3. Device according to claim 2, wherein the means for application is an application roller.

4. Device according to claim 2, wherein the adhesive application device provides for a spray application and means are provided that cover areas of the two plastic strips.

5. Device according to claim 2, wherein the adhesive application device is arranged at a distance from the intake rollers.

6. Device for producing a wound tube according to claim 2, wherein a profile protection is provided that runs inside the revision shaft and comprises articulated individual links to protect the two plastic strips that are unwound from the storage spools and are fed through the revision shaft to the winding assembler.

7. Device for producing a wound tube according to claim 6, wherein the profile protection comprises brake rollers for taking up a suspended load of the two plastic strips.

8. Device according to claim 7, wherein the profile protection comprises a brush device that precedes the adhesive application device, the brush device having bristles that are directed at least against facing surfaces of the two plastic strips to be joined to brush the facing surfaces.

* * * * *